(12) United States Patent
Koulomzin et al.

(10) Patent No.: US 8,447,516 B1
(45) Date of Patent: May 21, 2013

(54) EFFICIENT PROXIMITY DETECTION

(75) Inventors: Daniel George Koulomzin, Jamaica Plain, MA (US); Sergey Grabkovsky, Stoughton, MA (US); Christopher Richard Wren, Arlington, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/601,820

(22) Filed: Aug. 31, 2012

(51) Int. Cl.
*H04W 64/00* (2009.01)
*G01C 21/00* (2006.01)
*G06F 16/00* (2006.01)

(52) U.S. Cl.
USPC ......... 701/468; 701/300; 701/302; 455/456.2

(58) Field of Classification Search
USPC .... 701/468, 300, 302, 466, 516, 301; 377/21; 705/413; 455/456.2, 456.3, 456.6
See application file for complete search history.

(56) References Cited

U.S. PATENT DOCUMENTS

| | | | |
|---|---|---|---|
| 6,275,707 B1 | 8/2001 | Reed et al. | |
| 7,353,031 B2 | 4/2008 | Shi et al. | |
| 2009/0075677 A1 | 3/2009 | Seger et al. | |
| 2010/0131584 A1* | 5/2010 | Johnson | 709/203 |
| 2010/0222081 A1 | 9/2010 | Ward et al. | |
| 2010/0241351 A1* | 9/2010 | Meisels et al. | 701/201 |
| 2011/0171973 A1 | 7/2011 | Beck et al. | |

* cited by examiner

*Primary Examiner* — Tan Q Nguyen
(74) *Attorney, Agent, or Firm* — Shumaker & Sieffert, P.A.

(57) ABSTRACT

A server device may receive from a first computing device current location information associated with the first computing device. The server device may estimate a travel radius of a second computing device based at least in part on location information previously received from the second computing device, and may determine that the travel radius of the second computing device overlaps a proximity radius of the first computing device. The server device may query the second computing device for updated location information. The server device may receive the updated location information for the second computing device, and may determine that the second computing device is physically located substantially within the proximity radius of the first computing device based at least in part on the updated location information. In response, the server device may send to the first computing device an identification of the second computing device.

20 Claims, 5 Drawing Sheets

EFFICIENT PROXIMITY DETECTION

TECHNICAL FIELD

The disclosure relates to computing devices, and, more particularly, to efficient proximity detection.

BACKGROUND

With the widespread adoption of smartphones including built-in global positioning system (GPS) units, location-based social networking services that provide the ability to share your current location with your friends, as well as the ability to find out the current location of your friends, have become more popular. Some location-based social networking services may be able to alert smartphone users regarding any friends that are in their vicinity.

SUMMARY

In one aspect, the disclosure is directed to a method. The method may include receiving, by a server device from a first computing device, current location information associated with the first computing device. The method may further include estimating, by the server device, a travel radius of a second computing device based at least in part on location information previously received from the second computing device, wherein the travel radius includes a region of possible movement by the second computing device since the location information was previously received from the second computing device. The method may further include determining, by the server device, that the travel radius of the second computing device overlaps a proximity radius of the first computing device, wherein the proximity radius includes a region that extends outwards for a specified distance from a current location of the first computing device. The method may further include responsive to determining that the travel radius of the second computing device overlaps the proximity radius of the first computing device, querying, by the server device, the second computing device for updated location information. The method may further include receiving, by the server device, the updated location information for the second computing device. The method may include determining, by the server device, that the second computing device is physically located substantially within the proximity radius of the first computing device based at least in part on the updated location information received for the second computing device. The method may further include, responsive to determining that the second computing device is physically located substantially within the proximity radius, sending, by the server device to the first computing device, an identification of the second computing device.

In another aspect, the disclosure is directed to a computer-readable medium comprising instructions. The instructions, when executed by at least one programmable processor, may cause the at least one programmable processor to perform operations. The operations may include receiving, from a first computing device, current location information associated with the first computing device. The operations may further include estimating a travel radius of a second computing device based at least in part on location information previously received from the second computing device, wherein the travel radius includes a region of possible movement by the second computing device since the location information was previously received from the second computing device. The operations may further include determining that the travel radius of the second computing device does not overlaps a proximity radius of the first computing device, wherein the proximity radius includes a region that extends outwards for a specified distance from a current location of the first computing device. The operations may further include determining not to query the second computing device for updated location information.

In another aspect, the disclosure is directed to a server device. The server device may include one or more processors. The server device may further include a proximity module operable by the one or more processors and configured to: receive, from a first computing device, current location information associated with the first computing device; estimate a travel radius of a second computing device based at least in part on location information previously received from the second computing device, wherein the travel radius includes a region of possible movement by the second computing device since the location information was previously received from the second computing device; determine that the travel radius of the second computing device overlaps a proximity radius of the first computing device, wherein the proximity radius includes a region that extends outwards for a specified distance from a current location of the first computing device; query the second computing device for updated location information; receive the updated location information for the second computing device; and determine that the second computing device is not physically located substantially within the proximity radius of the first computing device based at least in part on the updated location information received for the second computing device.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
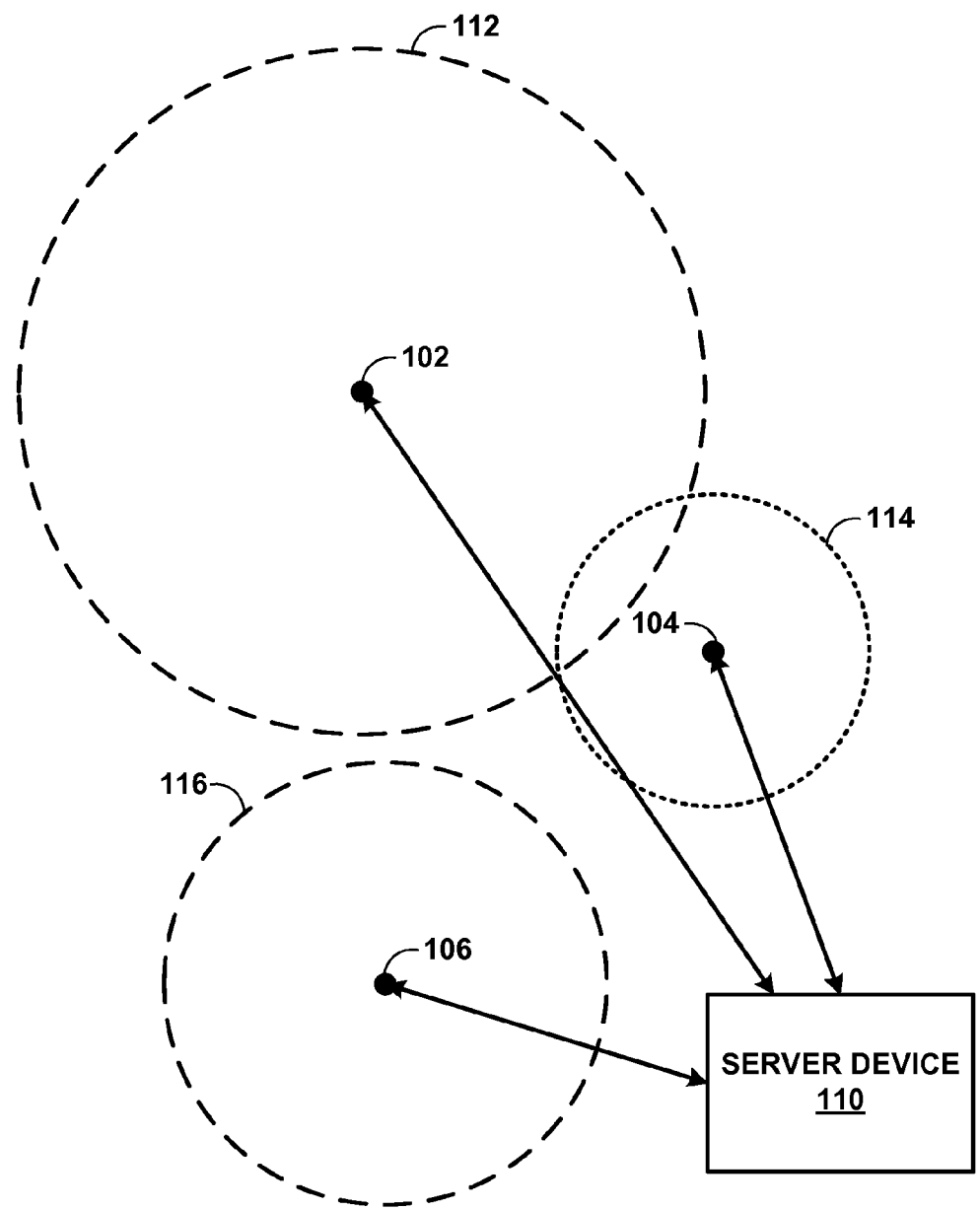
FIG. 1 is a conceptual diagram illustrating an example proximity detection system according to some aspects of the present disclosure.

In general, aspects of the present disclosure may be directed to techniques for a computing device to detect other computing devices within its vicinity in an energy efficient manner. Typically, a proximity detection service requires computing devices using the service to repeatedly transmit their location information (e.g., Global Positioning System coordinates) to the service at very short intervals (e.g., every few seconds), so that the service may have up-to-date location information for each computing device using the service. However, requiring every computing device associated with the service to periodically transmit their location information at very short intervals can be very energy inefficient for the computing devices, and may unnecessarily drain the batteries of computing devices transmitting their location information to the proximity detection service.

Some examples of the present disclosure may describe techniques for more energy efficient proximity detection by lengthening the intervals between the transmittal of location information by computing devices using the service, by estimating the potential movements of computing devices from their previous location(s) during the interval between the transmittals of location information, and/or by only querying the computing devices that are likely to be within the immediate vicinity of a requesting computing device for updated location information to determine the computing devices that are within the immediate vicinity of the requesting computing device.

In some examples, computing devices may transmit proximity context data (including, e.g., location information for that computing device) to a server device according to a predetermined frequency or schedule (e.g., every hour or every two hours). A given computing device may then request that the server device identify computing devices that are proximate to (e.g., within a specified distance of) itself. (The given computing device may send proximity context data to the server device.) After receiving the request, the server device may identify which computing devices may possibly be physically proximate to the requesting computing device.

Such a determination may be based, at least in part, on the last transmitted location information of each computing device and the amount of time that has elapsed since the last such transmission from each computing device. An estimated speed of movement (such as 60 miles per hour) may be assigned to each computing device, and a radius of possible current locations from that device's last known location may be estimated (e.g., by the server device). For example, if a computing device has an estimated speed of movement of 60 miles per hour (i.e. 1 mile per minute), a computing device may have an estimated radius of 10 miles from its last known location if ten minutes have elapsed since the computing device last transmitted its location information to the server device. The estimated speed of movement may be customized based on a variety of factors. For example, if a computing device is located in a dense city, such as New York City, then the estimated speed of movement for that computing device will likely be much lower than 60 MPH. For example, the estimated speed of movement might be walking speed, average taxi speed, average subway speed, or any other suitable average travel speed.

If the estimated radius of one of the other computing devices overlaps with the area of immediate vicinity of the requesting computing device (raising the possibility that the other computing device is within a specified distance of the requesting computing device), the server device may query the other computing device for updated location information. If this updated location information confirms that the other computing device is within the specified distance of the requesting computing device, the server device may send a notification to the requesting computing device that the other computing device is within the vicinity of the requesting computing device. In this way, only computing devices that have at least a certain probability of being within the vicinity of the requesting device are queried for their updated location information, and computing devices that do not have any possibility of being within the vicinity of the requesting device are not queried, thus reducing battery drain on those devices.

Furthermore, because it may be likely that a user of a requesting device may only be interested in the proximity of certain other users' computing devices, the number of computing devices queried by the server device may further be shrunken to computing devices associated with users that are friends on a social network with the user associated with the requesting device, or to computing devices that are included in the contact list of the requesting device.

For users who do not wish to share the location information of their associated computing device, it may be necessary for users to opt into the proximity detection service before the location of the computing device associated with the user is shared with other users. Furthermore, users may be able to limit who else can see their location, such as by being able to designate which users are able to access information regarding the user's location. For example, users may be able to limit the sharing of their location information to social networking friends, select groups or circles of social networking friends, or selected contacts included in the contact list of the computing device.

FIG. 1 is a conceptual diagram illustrating an example proximity detection system according to some aspects of the present disclosure. As shown in FIG. 1, computing device 102, computing device 104, and computing device 106 may communicate with server device 110 and may periodically send location information associated with each of computing devices 102, 104, and 106 to server device 110. Server device 110 may periodically, such as every hour or every two hours, receive location information associated with each of computing device 102, computing device 104, and computing device 106.

Server device 110 may receive a request from computing device 104 for an indication of one or more computing devices that are physically proximate to computing device 104, including receiving from computing device 104 current location information associated with computing device 104. Computing devices may be considered to be physically proximate to computing 104 by being located within proximity radius 114 for computing device 104. Proximity radius 114 for computing device 104 may include a region that extends for a specified distance outwards from the current location of computing device 104.

Server device 110 may estimate travel radius 112 for computing device 102. Travel radius 112 for computing device 102 may include the region of possible movement by computing device 102 since computing device 102 last sent location information associated with computing device 102 to server device 110, and may be estimated by server device 110 based at least in part on the location information associated with computing device 102 previously received by server device 110 from computing device 102, a maximum speed estimated for computing device 102, and an elapsed time since server device 110 last received location information from computing device 102. For example, server device 110 may multiply the estimated maximum speed with the elapsed time to determine the estimated maximum distance computing device 110 may be able to travel during the elapsed time.

Server device 110 may determine whether travel radius 112 overlaps proximity radius 114. As shown in FIG. 1, travel radius 112 for computing device 102 overlaps proximity radius 114 for computing device 104. Therefore, there may likely be a non-zero probability that computing device 102 is now located in the area bounded by proximity radius 114. Server device 110 may also determine how much travel radius 112 overlaps proximity radius 114, including determining whether travel radius 112 overlaps proximity radius 114 by more or less than a minimum threshold of overlap. For example, server device 100 may re-query computing device 102 for its updated location information only if travel radius 112 overlaps at least a specified amount or percentage of proximity radius 114. Conversely, server device 110 may also determine whether travel radius overlaps the proximity radius 114 by more or less than a maximum threshold of overlap. For example, if travel radius 112 overlaps proximity radius 114 by more than a specified amount or percentage of radius 114, server device 110 may determine that computing device 102 is physically proximate to computing device 104 without re-querying computing device 102 for its updated location information.

Server device 110 may query computing device 102 for its updated location information, and server device 110 may receive the updated location information for computing device 102. Based at least in part on the updated location information for computing device 102, server device 110 may determine whether computing device 102 is physically located substantially within proximity radius 114 for computing device 104. If server device determines that computing device 102 is physically located substantially within proximity radius 114, server device 110 may, responsive to determining that computing device 102 is physically located substantially within proximity radius 114, send an identification of computing device 102 to computing device 104.

Responsive to the request from computing device 104 for an indication of one or more computing devices that are physically proximate to computing device 104, server device 110 may also estimate travel radius 116 for computing device 106. Travel radius 116 may include the region of possible movement by computing device 106. Travel radius 116 may be estimated by server device 110 based at least in part on the location information associated with computing device 106 previously received by server device 110 from computing device 106. Travel radius 116 of computing device 106 may be smaller than travel radius 112 of computing device 102 because computing device 106 may have an estimated speed of travel that is slower than the estimated speed of travel for computing device 102. For example, the last location information for computing device 102 received by server device 110 may indicate that computing device 102 was last located in a rural location, while the last location information for computing device 106 received by server device 110 may indicate that computing device 106 was located in a city center. Therefore computing device 106 may be estimated to have a slower speed of movement in an urban location than computing device 102 in a rural location.

Furthermore, if computing device 102 is highly likely to be within the proximity radius 114 of computing device 104, server device 110 may determine that computing device 102 is physically proximate to computing device 104 without querying computing device 102 for updated location information. For example, if computing device 102 had in the recent past (e.g., no more than five minutes ago) sent location information to server device 110 indicating that computing device 102 is within the proximity radius of 114, and if server device 110 determines that it is unlikely that computing device 102 has moved out of the proximity radius 114 in the intervening time period, then server device 110 may determine that computing device 102 is still physically proximate to computing device 104 without querying computing device 102 for updated location information. In some examples, server device 110 may estimate a probability of computing device 102 being physically proximate to computing device 104 based on the previous location reported by computing device 192 and the elapsed time since computing device 102 last reported its location. If the estimated probability is above a specified threshold (e.g., above 80% probability of being physically proximate to computing device 104), server device 110 may determine that computing device 102 is physically proximate to computing device 104 (i.e., within the proximity radius 114) without querying computing device 102 for updated location information.

As shown in FIG. 1, travel radius 116 of computing device 106 does not overlap proximity radius 114 of computing device 104. Therefore, there may likely be zero probability that computing device 106 is currently located within the area bounded by proximity radius 114, and thus server device 110 may determine that it does not need to query computing device 106 for updated information. By not querying computing device 106 for updated location information because computing device 106 has zero probability of being physically proximate to computing device 104, server device 110 may enable computing device 106 to preserve its battery power by not activating computing device 106's GPS device to determine updated location information for computing device 106.

Figure 2:
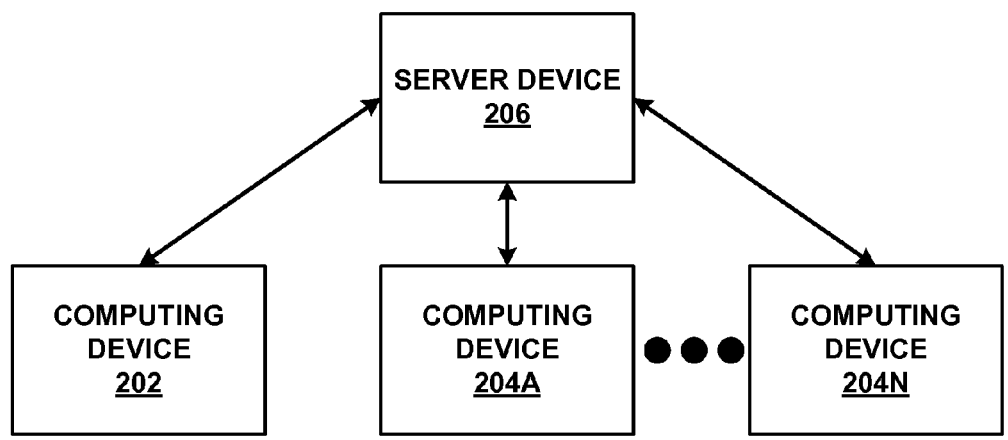
FIG. 2 is a block diagram illustrating an example proximity detection system according to some aspects of the present disclosure.

FIG. 2 is a block diagram illustrating an example proximity detection system including example server device 206, such as server device 110 shown in FIG. 1, example computing device 202, such as computing device 104 shown in FIG. 1, and example computing devices 204A-204N, such as computing devices 102 and 106 shown in FIG. 1, according to some aspects of the present disclosure. As shown in FIG. 2, computing device 202 and computing devices 204A-204N ("computing devices 204") are communicably coupled to server device 206. Computing device 202 and computing devices 204 may periodically send location information associated with computing device 202 and each of computing devices 204 to server device 206. Computing device 202 may send a query to server device 206 for an indication of one or more of computing devices 204 that are physically proximate to computing device 202, and in response server device 206 may send to computing device 202 an indication of one or more of computing devices 204 that are physically proximate to computing device 202.

Examples of computing device 202 and computing devices 204 may include, but are not limited to, portable or mobile computing devices such as mobile phones (including smart phones), laptop computers, personal digital assistants (PDA's), portable gaming devices, portable media players, and e-book readers, as well as desktop computers, set top boxes, gaming systems, televisions, and the like, including a combination of two or more of these items. Examples of server device 206 may include, but are not limited to, a web server, a server application, a distributed server system, a physical computer, and the like. Computing device 202 and computing devices 204 may communicate with server device 206 via a network, such as the Internet, local area network, wide area network, and the like.

In some examples, computing device 202 and computing devices 204 may periodically send current location information associated with computing device 202 and each of the computing devices 204 to server device 206. Current location information associated with the computing device 202 may include information regarding the current physical location of computing device 202. Likewise, current location information associated with each of the computing devices 204 may also include information regarding the current physical location of each of the computing devices 204. Examples of location information may include or may be derived from global positioning system (GPS) data indicating the current location of the associated computing device, information regarding Wi-Fi hotspots that are within communication range of the associated computing device, information regarding cell towers that are within communication range of the associated computing device, or any other indication of the physical location of the associated computing device. Computing device 202 and computing devices 204 may, in some examples, periodically send their location information to server device 206 every one hour, every two hours, or with any other suitable frequency to minimize the power drain on the computing device 202 and computing devices 204. Computing device 202 and computing devices 204 may, in some examples, periodically send their location information to server device 206 no more frequently than once every hour.

Server device 206 may receive from computing device 202 current location information associated with computing device 202. Receiving the current location information may include receiving a request from computing device 202 for an indication of one or more of computing devices 204 that are physically proximate to computing device 202, such as by being within a proximity radius that extends for a specified distance outwards from computing device 202. The proximity radius of computing device 202 may be a region around the location of computing device 202 that extends for a specified distance from the location of computing device 202, and any of computing devices 204 located within the proximity radius of computing device 202 may be considered to be physically proximate of computing device 202.

After receiving the current location information, server device 206 may determine which one or more of computing devices 204 are within the proximity radius of computing device 202 by estimating a travel radius of each of the computing devices 204 based at least in part on the current location information previous received from computing devices 204 and the time that has elapsed since server 206 last received the current location information for each of the computing devices 204. A travel radius may be a region of possible movement by each of the computing devices 204 since location information was last received from computing devices 204, and may, in some examples, be estimated for a computing device out of computing devices 204 by estimating a speed of travel for the computing device and multiplying the estimated speed of travel with the amount of time that has elapsed since the computing device last sent location information for the computing device to server device 206.

For example, if the most recent location information for a computing device of the computing devices 204 was received an hour ago, and server device 206 estimates the speed of travel of the computing device out of the computing devices 204 as having a speed of travel of 60 miles per hour, then the estimated travel radius of the computing device may be 60 miles extending from the physical location for the computing device based on the most recent location information received an hour ago from the computing device. The speed of travel for the computing device may be estimated based at least in part on the most recent location information of the computing device. For example, if the most recent location information indicates that the computing device is located in a dense city, such as New York City, then the speed of travel may be estimated to be much slower than 60 miles for hour. For example, the speed of travel may be estimated to be the average speed of travel of New York City subway cars, the average speed of travel of New York City cabs, or the average speed of walking in New York City. In some examples, the speed of travel may be set to zero, so that in some situations the computing device may be estimated to be at rest.

In some examples, the server device 206 may estimate the travel radius of computing devices 204 or otherwise determine if one or more of computing devices 204 are located within the proximity radius of computing device 202 only if the user associated with each of the computing devices 204 is somehow associated with a user associated with computing device 202. In this way, the number of computing devices that the server device may have to consider may be reduced. In some examples, a user of one of the computing devices 204 may be associated with a user of computing device 202 if a contact list of computing device 202 includes contact information associated with the user of one of the computing devices 204. In some other examples, a user of one of the computing devices 204 may also be associated with a user of computing device 202 if the user of computing device 202 is associated with the user of one of the computing devices 204 in a social network, such as by being included in a Google+ circle.

Server device 206 may determine that one or more of computing devices 204 have an estimated travel radius that overlaps the proximity radius of computing device 202, meaning that one or more computing devices 204 may have a non-zero probability of being within the proximity radius of computing device 202. Server device 206 may query each of the one or more computing devices 204 for updated location information, and in response each of the one or more computing devices 204 may send updated location information to server device 206. As can be seen, server device 206 may use the estimated travel radius of each of the computing devices 204 to exclude computing devices, so it may not be necessary for server device 204 to query any of the computing devices 204 having an estimated travel radius that does not overlap the proximity radius of computing device 202 for updated location information, thereby reducing unnecessary battery drain for those excluded computing devices from have to capturing and sending updated location information 204 to server device 206.

After receiving the updated location information, server device 206 may confirm that one or more of the one or more computing devices 204 is physically located substantially within the proximity radius of computing device 202 based at least in part on the updated location information. Server device 206 may, responsive to confirming, send to computing device 202 an identification of the one or more of the one or more computing devices 204 that are physically proximate to computing device 202. Server device 206 may also send to computing device 202 contact information associated with the one or more of the one or more computing devices 204. The contact information may include but is not limited to a phone number, an internet protocol address, a Bluetooth address, an e-mail address, a name, and the like.

Figure 3A:
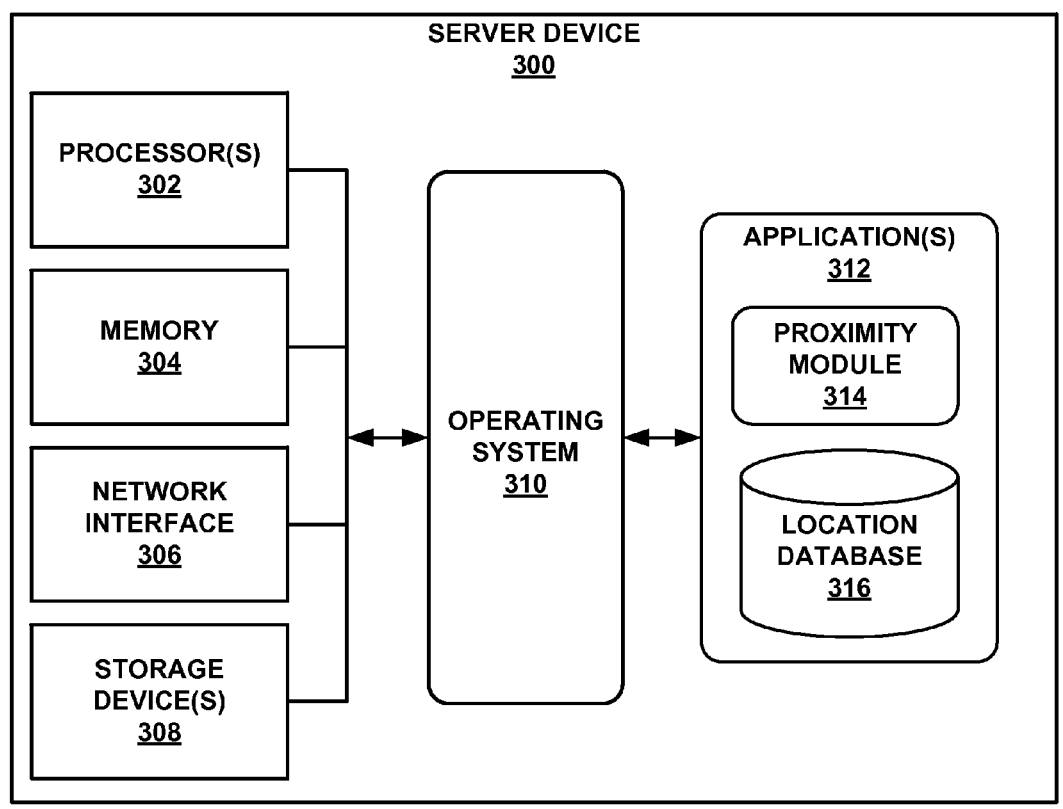
FIG. 3A is a block diagram illustrating an example server device according to some aspects of the present disclosure.

FIG. 3A is a block diagram illustrating further details of one example of a server device, such as server device 206 shown in FIG. 2, in accordance with some aspects of the present disclosure. FIG. 3A illustrates only one particular example of a server device, and many other examples of the server device may be used in other instances.

As shown in the specific example of FIG. 3A, server device 300 may include one or more processors 302, memory 304, network interface 306, and one or more storage devices 308. Server device 300 may also include operating system 302 that is executable by server device 300. Server device 300, in one example, may further include one or more applications 310, including proximity module 314 and location database 316. Each of the components 302, 304, 306, 308, 310, 312, 314, and 316 may be interconnected (physically, communicatively, and/or operatively) for inter-component communications.

One or more processors 302, in one example, may be configured to implement functionality and/or process instructions for execution within server device 300. For example, one or more processors 292 may be capable of processing instructions stored in memory 304 or instructions stored on one or more storage devices 308.

Memory 304, in one example, may be configured to store information within server device 300 during operation. Memory 304, in some examples, may be described as a computer-readable storage medium. In some examples, memory 304 may be a temporary memory, meaning that a primary purpose of memory 304 may not be long-term storage. Memory 304, in some examples, may be described as a volatile memory, meaning that memory 304 may not maintain stored contents when the computer is turned off. Examples of volatile memories may include random access memories (RAM), dynamic random access memories (DRAM), static random access memories (SRAM), and other forms of volatile memories known in the art. In some examples, memory 304 may be used to store program instructions for execution by one or more processors 302. Memory 304, in one example, may be used by software or applications running on server device 300 (e.g., one or more applications 312) to temporarily store information during program execution.

One or more storage devices 308, in some examples, may also include one or more computer-readable storage media. One or more storage devices 308 may be configured to store larger amounts of information than memory 304. One or more storage devices 308 may further be configured for long-term storage of information. In some examples, one or more storage devices 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Server device 300, in some examples, may also include network interface 306. Server device 300, in one example, uses network interface 306 to communicate with external devices, such as computing device 202 and computing devices 204 shown in FIG. 2, via one or more networks, such as one or more wireless networks. Network interface 306 may be a network interface card, such as an Ethernet card, an optical transceiver, a radio frequency transceiver, or any other type of device that can send and receive information. Other examples of such network interfaces may include Bluetooth®, 3G and Wi-Fi® radios in mobile computing devices as well as USB. In some examples, server device 300 may use network interface 306 to wirelessly communicate with an external device, a mobile phone, or other networked computing device.

Server device 300 may include operating system 310. Operating system 310, in some examples, may control the operation of components of server device 300. For example, operating system 310 may facilitate the interaction of one or more applications 312, including proximity module 314 and location database 316, with one or more processors 302, memory 304, network interface 306, and one or more storage devices 308. One or more applications 312 may include program instructions and/or data that are executable on one or more processors 302.

One or more applications 312 may include proximity module 314. Proximity module 314 may be an application operable by one or more processors 302 and may be configured to receive current location information associated with computing devices including a first computing device and a second computing device. Current location information associated with computing devices may include information regarding the current physical location of each of the computing devices. Examples of location information may include or may be derived from GPS data indicating the current location of the associated computing device, information regarding Wi-Fi hotspots that are within communication range of the associated computing device, information regarding cell towers that are within communication range of the associated computing device, or any other indication of the physical location of the associated computing device. Proximity module 314 may, in some examples, periodically receive location information from each of the computing devices every one hour, every two hours, or with any other suitable frequency to minimize the power drain on the computing devices. Proximity module 314 may, in some examples, periodically receive location information from each of the computing devices no more frequently than once every hour.

Proximity module 314 may be further configured to receive from the first computing device current location information associated with the first computing device. Receiving the current location information associated with the first computing device may include receiving a request from the first computing device for an indication of one or more computing devices that are physically proximate to the first computing device, such as by being within a proximity radius that extends for a specified distances outwards from the first computing device.

Proximity module 314 may further be configured to estimate a travel radius of a second computing device based at least in part on location information previously received from the second computing device, where the travel radius may include a region of possible movement by the second computing device since the location information was previously received from the second computing device. The travel radius may, in some examples, be estimated for the second computing device by estimating a speed of travel for the second computing device and multiplying the estimated speed of travel with the amount of time that has elapsed since the proximity module 314 last received location information for the second computing device.

Proximity module 314 may further be configured to determine that the travel radius of the second computing device overlaps a proximity radius of the first computing device, where the proximity radius may include a region that extends outwards for a specified distance from a current location of the first computing device. Proximity module 314 may be configured to query the second computing device for updated location information and, in response, and to receive updated location information for the second computing device. Proximity module 314 may further be configured to determine that the second computing device is physically located substantially within the proximity radius of the first computing device based at least in part on the updated location information, and to, responsive to determining that the second computing device is physically located substantially within the proximity radius of the first computing device, send to the first computing device an identification of the second computing device.

One or more applications 312 may also include location database 316. Location database 316 may be an application operable by one or more processors 302 and configured to store location information received by server device 300 from external devices, such as computing device 202 and computing devices 204 shown in FIG. 2.

Figure 3B:
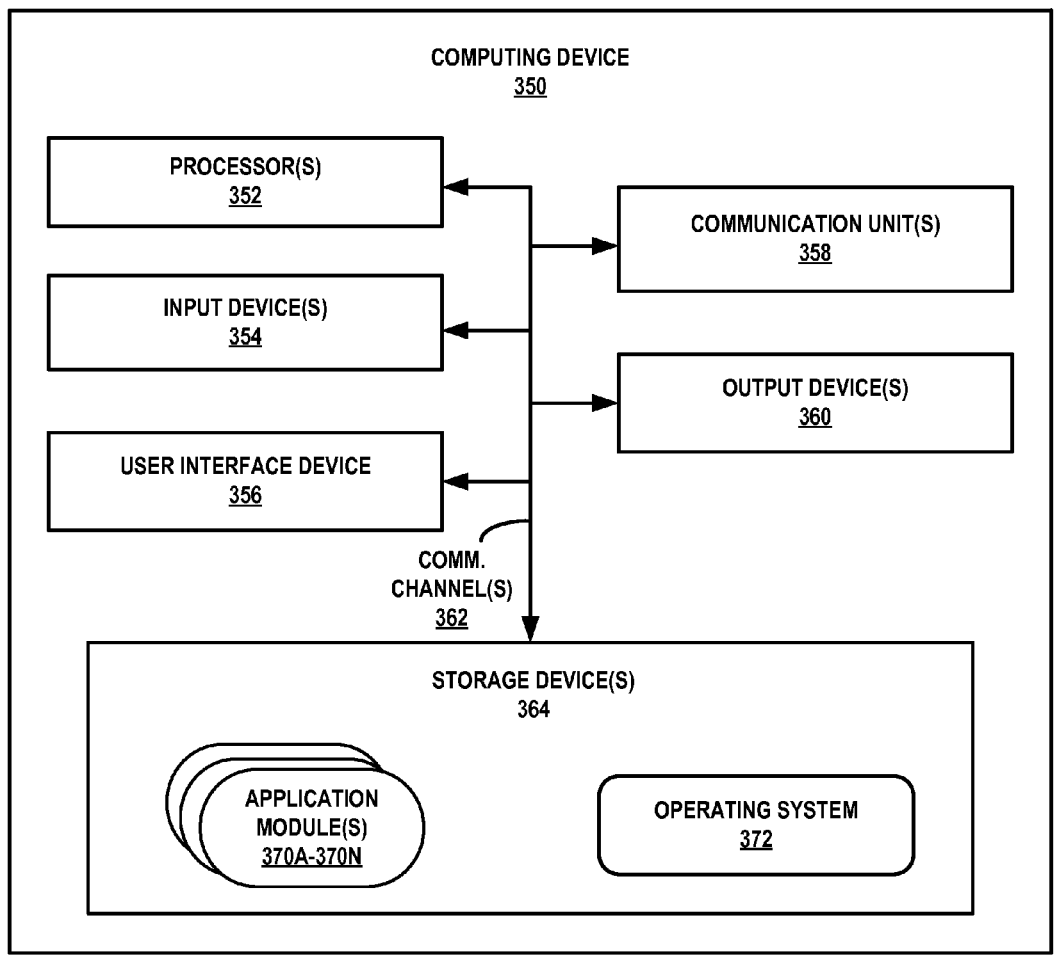
FIG. 3B is a block diagram illustrating an example computing device according to some aspects of the present disclosure.

FIG. 3A is a block diagram illustrating further details of one example of a computing device, such as computing device 202 shown in FIG. 2, in accordance with some aspects of the present disclosure. FIG. 3B illustrates only one particular example of a computing device, and many other examples of the server device may be used in other instances.

As shown in the specific example of FIG. 3, computing device 350 may include one or more processors 352, one or more communication units 358, one or more storage devices 364, one or more input devices 354, one or more output devices 360, user interface device 356, and communication channels 362. Computing device 350 may also include an operating system 372. Computing device 350, in one example, may further include one or more application modules 370A-370N ("application modules 370"). Application modules 370 may also be executable by computing device 350. Components of computing device 350 may be interconnected (physically, communicatively, and/or operatively) for inter-component communications via communication channels 362.

One or more processors 352, in one example, may implement functionality and/or process instructions for execution within computing device 350. For example, one or more processors 352 may be capable of processing instructions stored on one or more storage devices 364 (including instructions store in memory), such as instructions of application modules 370 stored in storage device 364.

One or more storage devices 364, in some examples, may also include one or more computer-readable storage media. One or more storage devices 364 may further be configured for long-term storage of information. In some examples, one or more storage devices 364 may include non-volatile storage elements. Examples of such non-volatile storage elements may include magnetic hard disks, optical discs, floppy disks, Flash memories, or forms of electrically programmable memories (EPROM) or electrically erasable and programmable (EEPROM) memories. In some examples, operating system 372 and application modules 370 may be stored in one or more storage devices 364.

Storage devices 364 may also include memory. Memory, in one example, may store information within computing device 350 during operation. Memory, in some examples, may represent a computer-readable storage medium. In some examples, memory may be a temporary memory, meaning that a primary purpose of memory may not be long-term storage. Memory, in some examples, may be described as a volatile memory, meaning that memory may not maintain stored contents when computing device 350 is turned off. Examples of volatile memories may include random access memories (RAM), dynamic random access memories (DRAM), static random access memories (SRAM), and other forms of volatile memories known in the art. In some examples, memory may be used to store program instructions for execution by one or more processors 352. Memory, in one example, may be used by software or applications running on computing device 350 (e.g., application modules 370) to temporarily store data and/or instructions during program execution.

Computing device 350, in some examples, may also include one or more communication units 358. Computing device 350, in such examples, may use one or more communication units 358 to communicate with external devices via one or more networks, such as one or more wired or wireless networks. One or more communication units 358 may be a network interface card, such as an Ethernet card, an optical transceiver, a radio frequency transceiver, or any other type of device that can send and receive information. Other examples of such communication units may include Bluetooth®, 3G and WiFi® radios in mobile computing devices as well as USB. In some examples, computing device 350 may use one or more communication units 358 to wirelessly communicate with an external device (e.g., server device 300 shown in FIG. 3A) such as a server, mobile phone, or other networked computing device.

Computing device 350 may also include one or more input devices 354. Input devices 354, in some examples, may be configured to receive input from a user through tactile, electromagnetic, audio, and/or video feedback. Examples of input devices 354 may include a touch-sensitive display, mouse, keyboard, voice responsive system, video camera, microphone or any other type of device for detecting gestures by a user. In some examples, a touch-sensitive display may include a presence-sensitive screen.

One or more output devices 360 may also be included in computing device 350. One or more output devices 360, in some examples, may be configured to provide output to a user using tactile, audio, or video stimuli. One or more output devices 360, in one example, may include a display, sound card, a video graphics adapter card, or any other type of device for converting a signal into an appropriate form understandable to humans or machines. Additional examples of one or more output device 360 may include a speaker, a cathode ray tube (CRT) monitor, a liquid crystal display (LCD), or any other type of device that can generate intelligible output to a user.

User interface device 356 may also be included in computing device 350. User interface device 356, in some examples, may be a combination of input device 354 and output device 360, so that it is configured to receive input from a user and to provide output to the user. Examples of user interface device 356 may include a presence-sensitive screen.

Examples of computing device 350 may include operating system 372. Operating system 372 may control the operation of components of computing device 350. For example, operating system 372 may facilitate the interaction of one or more application modules 370 with hardware components of computing device 350.

Application modules 370 may include one or more application modules that receives, via one or more communication units 358, a query from the server device for updated location information of computing device 350, and sends, via one or more communication units 358 to the server device, updated location information of computing device 350. In some examples, one or more of application modules 370 may interface with GPS hardware (not shown) in computing device 350 to receive location information of computing device 350 and may send that information to the server device via one or more communication units 358.

Any applications, e.g., one or more application modules 370, implemented within or executed by computing device 350 may be implemented or contained within, operable by, executed by, and/or be operatively/communicatively coupled to components of computing device 350, e.g., one or more processors 352, one or more input devices 354, user interface device 356, communication units 358, output devices 360, communication channels 362, storage devices 364, and operating system 372.

Figure 4:
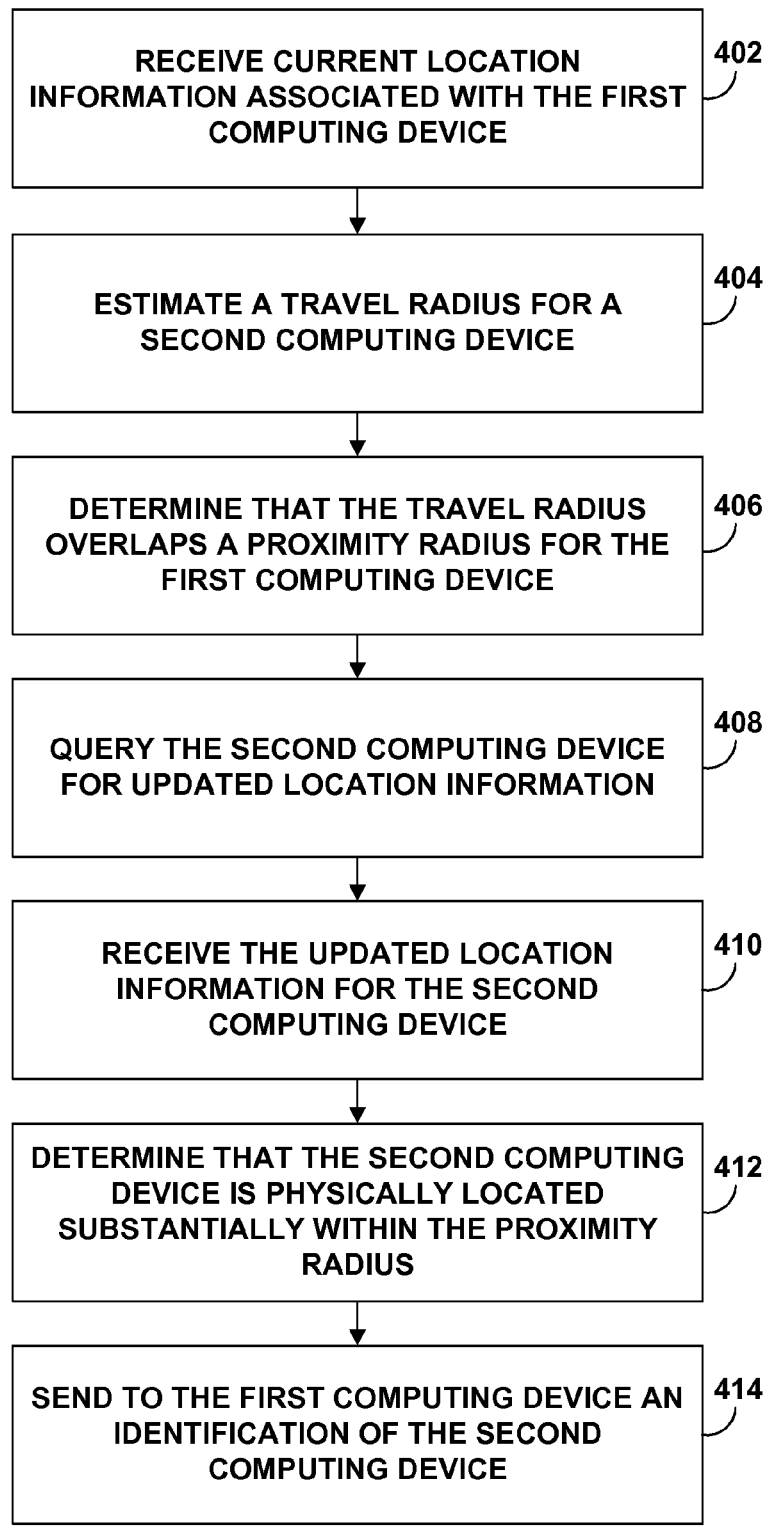
FIG. 4 is a flowchart illustrating an example operation of a process for proximity detection according to some aspects of the present disclosure.

FIG. 4 is a flow chart illustrating an example operation of a process for providing proximity information to a computing device according to some aspects of the present disclosure. The process may include receiving, by a server device (e.g., server device 206 of FIG. 2 and server device 300 of FIG. 3A) from a first computing device (e.g., computing device 202 of FIG. 2 and computing device 350 of FIG. 3B), current location information associated with the first computing device (402). Receiving the current location information associated with the first computing device may include receiving, by the server device from the first computing device, a request for an indication of computing devices proximate to the first computing device.

The process may further include estimating, by the server device, a travel radius of a second computing device (e.g., one of computing devices 204 of FIG. 2) based at least in part on location information previously received from the second computing device, where the travel radius includes a region of possible movement by the second computing device since the location information was previously received from the second computing device (404). Estimating the travel radius may include estimating a speed of movement for the second computing device. Estimating the speed of movement for the second computing device may be based at least in part on the estimated speed of movement for the second device and an elapsed time since the server device last received location information from the second computing device. Estimating the travel radius of the second computing device may include multiplying the estimated speed of movement for the second computing device by the elapsed time since the server device last received location information from the second computing device. Estimating the speed of movement for the second computing device may also be based at least in part on a location of the second computing device. Estimating the speed of movement for the second computing device may also include estimating that the second computing device is stationary.

The process may further include determining, by the server device, that the travel radius of the second computing device overlaps a proximity radius of the first computing device, where the proximity radius includes a region that extends outwards for a specified distance from a current location of the first computing device (406). The process may further include, responsive to determining that the travel radius of the second computing device overlaps the proximity radius of the first computing device, querying, by the server device, the second computing device for updated location information (408). The process may further include receiving, by the server device, the updated location information for the second computing device (410). The process may further include determining, by the server device, that the second computing device is physically located substantially within the proximity radius of the first computing device based at least in part on the updated location information received for the second computing device (412). The process may further include, responsive to determining that the second computing device is physically located substantially within the proximity radius, sending, by the server device, to the first computing device, an identification of the second computing device (414).

In some example, the first computing device may be associated with a first user, the second computing device may be associated with a second user, and the travel radius of the second computing device is determined only if the first computing device determines that the second user is associated with the first user. For example, the first computing device may determine that the second user is associated with the first user if a contact list of the first computing device includes contact information associated with the second user, or the second user may be associated with the first user if the first user is associated with the second user in a social network.

In some examples, the current location information and the updated location information may include global positioning system (GPS) data. The current location information and the updated location information may also include wireless hotspots (e.g., Wi-Fi hotspots) that are within communication range of the first computing device and the second computing device.

In some examples, the process may further include querying, by the server device, the second computing device for the updated location information. In some examples, the process may further include responsive to determining that the second computing device is physically located substantially within the proximity radius, sending, by the server device, to the second computing device, an identification of the first computing device. In some examples, the process may further include periodically receiving, by the server device from the second computing device, updated location information. In some examples, the server device receives the updated location information no more than once every hour.

In some examples, determining, by the server device, that the travel radius of the second computing device overlaps the proximity radius of the first computing device may further comprise determining that the travel radius overlaps the proximity radius by more than a minimum threshold. In some examples, determining, by the server device, that the travel radius of the second computing device overlaps the proximity radius of the first computing device, may further comprise determining that the travel radius overlaps the proximity radius by less than a maximum threshold.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EE- PROM), flash memory, a hard disk, a compact disc ROM (CD-ROM), a floppy disk, a cassette, magnetic media, optical media, or other computer readable media. In some examples, an article of manufacture may comprise one or more computer-readable storage media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

As used throughout this disclosure, headings are included to improve the clarity of the disclosure and are not used to define separate examples. In some examples, features of various examples may be combined and/or used from among multiple headings.

Various embodiments of the invention have been described. These and other embodiments are within the scope of the following claims.

The invention claimed is:

1. A method comprising:
receiving, by a server device from a first computing device, current location information associated with the first computing device;
estimating, by the server device, a travel radius of a second computing device based at least in part on location information previously received from the second computing device, wherein the travel radius includes a region of possible movement by the second computing device since the location information was previously received from the second computing device;
determining, by the server device, that the travel radius of the second computing device overlaps a proximity radius of the first computing device, wherein the proximity radius includes a region that extends outwards for a specified distance from a current location of the first computing device;
responsive to determining that the travel radius of the second computing device overlaps the proximity radius of the first computing device, querying, by the server device, the second computing device for updated location information;
receiving, by the server device, the updated location information for the second computing device;
determining, by the server device, that the second computing device is physically located substantially within the proximity radius of the first computing device based at least in part on the updated location information received for the second computing device; and
responsive to determining that the second computing device is physically located substantially within the proximity radius, sending, by the server device to the first computing device, an identification of the second computing device.

2. The method of claim 1, wherein estimating the travel radius of the second computing device further comprises:
estimating a speed of movement for the second computing device.

3. The method of claim 2, wherein estimating the travel radius of the second computing device is based at least in part on the estimated speed of movement for the second computing device and an elapsed time since the server device last received location information from the second computing device.

4. The method of claim 3, wherein estimating the travel radius of the second computing device further comprises:
multiplying the estimated speed of movement for the second computing device by the elapsed time since the server device last received location information from the second computing device.

5. The method of claim 2, wherein estimating the speed of movement for the second computing device is based at least in part on a location of the second computing device.

6. The method of claim 2, wherein estimating the speed of movement for the second computing device comprises:
estimating that the second computing device is stationary.

7. The method of claim 1, wherein:
the first computing device is associated with a first user;
the second computing device is associated with a second user; and
the travel radius of the second computing device is determined only if the first computing device determines that the second user is associated with the first user.

8. The method of claim 7, wherein the first computing device determines that the second user is associated with the first user if a contact list of the first computing device includes contact information associated with the second user.

9. The method of claim 7, wherein the first computing device determines the second user is associated with the first user if the first user is associated with the second user in a social network.

10. The method of claim 1, wherein the current location information and the updated location information comprises global positioning system (GPS) data.

11. The method of claim 1, wherein the current location information comprises wireless hotspots detected by the first computing device.

12. The method of claim 1, further comprising:
querying, by the server device, the second computing device for the updated location information.

13. The method of claim 1, further comprising:
responsive to determining that the second computing device is physically located substantially within the proximity radius, sending, by the server device to the second computing device, an identification of the first computing device.

14. The method of claim 1, wherein receiving, from the first computing device, the current location information associated with the first computing device further comprises:
receiving, by the server device from the first computing device, a request for an indication of computing devices that are proximate to the first computing device.

15. The method of claim 1, further comprising:
periodically receiving, by the server device from the second computing device, updated location information.

16. The method of claim 1, wherein periodically receiving comprises:
receiving the updated location information no more than once every hour.

17. The method of claim 1, wherein determining, by the server device, that the travel radius of the second computing device overlaps the proximity radius of the first computing device further comprises:
determining that the travel radius overlaps the proximity radius by more than a minimum threshold.

18. The method of claim 1, wherein determining, by the server device, that the travel radius of the second computing device overlaps the proximity radius of the first computing device further comprises:
determining that the travel radius overlaps the proximity radius by less than a maximum threshold.

19. A computer-readable medium comprising instructions that, when executed by at least one programmable processor, cause the at least one programmable processor to perform operations comprising:

receiving, from a first computing device, current location information associated with the first computing device;

estimating a travel radius of a second computing device based at least in part on location information previously received from the second computing device, wherein the travel radius includes a region of possible movement by the second computing device since the location information was previously received from the second computing device;

determining that the travel radius of the second computing device does not overlap a proximity radius of the first computing device, wherein the proximity radius includes a region that extends outwards for a specified distance from a current location of the first computing device; and determining not to query the second computing device for updated location information.

20. A server device comprising:

one or more processors; and a proximity module operable by the one or more processors and configured to:

receive, from a first computing device, current location information associated with the first computing device;

estimate a travel radius of a second computing device based at least in part on location information previously received from the second computing device, wherein the travel radius includes a region of possible movement by the second computing device since the location information was previously received from the second computing device;

determine that the travel radius of the second computing device overlaps a proximity radius of the first computing device, wherein the proximity radius includes a region that extends outwards for a specified distance from a current location of the first computing device;

responsive to determining that the travel radius of the second computing device overlaps the proximity radius of the first computing device, query the second computing device for updated location information;

receive the updated location information for the second computing device; and determine that the second computing device is not physically located substantially within the proximity radius of the first computing device based at least in part on the updated location information received for the second computing device.

* * * * *